No. 627,108. Patented June 20, 1899.
M. FISHEL.
CASTER.
(Application filed May 7, 1898.)
(No Model.)

WITNESSES:
C. E. Ashley
John French

INVENTOR:
Mark Fishel
By his Attorney
Willard Parker Butler

THE NORRIS PETERS CO., PHOTO-LITHO., WASHINGTON, D. C.

UNITED STATES PATENT OFFICE.

MARK FISHEL, OF NEW YORK, N. Y.

CASTER.

SPECIFICATION forming part of Letters Patent No. 627,108, dated June 20, 1899.

Application filed May 7, 1898. Serial No. 679,995. (No model.)

*To all whom it may concern:*

Be it known that I, MARK FISHEL, a citizen of the United States, and a resident of the borough of Manhattan, city, county, and State of New York, have invented a new and useful Improvement in Fasteners for Casters, of which the following is a specification.

My invention relates to an improvement in devices for fastening casters to the posts or supports of furniture, and particularly to an improvement in devices for fastening casters to the tubular posts or supports of iron or other like furniture, and has for its object to provide an inexpensive, efficient, and simple fastener for use in this connection.

The invention consists in the novel construction of fastener, and particularly a novel construction of that class of fastener which by means of spring-tongues holds itself within the post or socket and at the same time holds the caster within itself, thus affording an intermediate connection between the caster on the one hand and the post or socket in which it is placed on the other hand.

The invention will be best understood by reference to the accompanying sheet of drawings, forming a part of this specification, in which—

Figure 1:
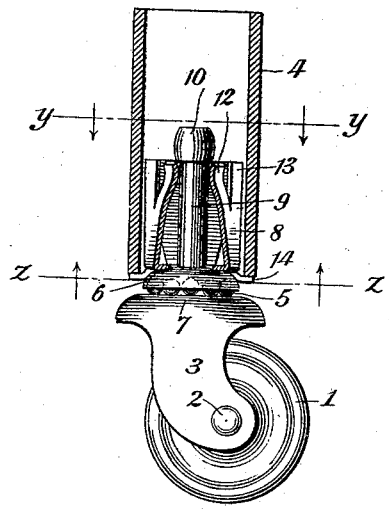
Figure 4:
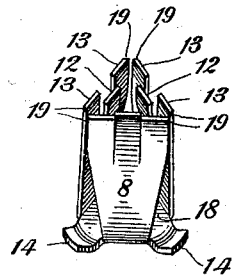
Figure 2:
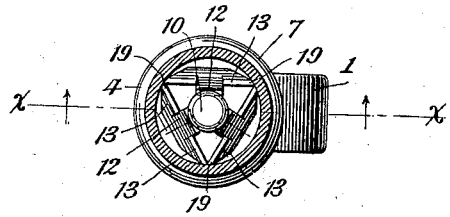
Figure 5:
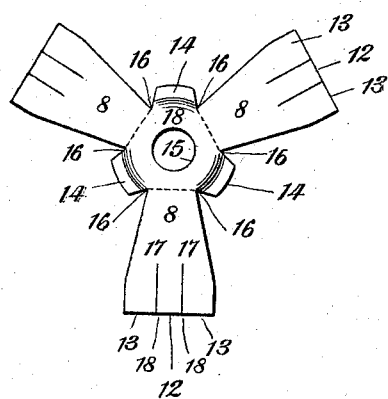
Figure 3:
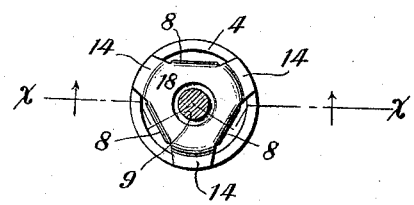

Figure 1 is a vertical section of the tubular post or support and the fastener and a side elevation of a caster inserted in place. Fig. 2 is a cross-section of the post, showing the fastener in projection upon the line $y\ y$ of Fig. 1. Fig. 3 is a plan view of the fastener post or socket, looking upward on the line $z\ z$ of Fig. 1. Fig. 4 is a perspective view of the fastener. Fig. 5 is a plan view of the piece of metal from which the fastener is cut prior to being bent up into the shape shown in Fig. 4 to form the fastener.

Similar figures refer to similar parts throughout the several views.

In the drawings, 4 represents the tubular post or support of a piece of furniture; 1, a caster-wheel; 3, the usual form of casterframe, with downwardly-projecting brackets or horns on either side; 2, the pin upon which the roller rotates; 7, the flat surface or top of the frame upon which the balls 5 5 rotate in the bearing-plate 6 and which form a ball-bearing for the caster.

9 is the spindle of the caster, attached at its extremity to the socket 6 of the ball-bearing, and 10 is the enlarged head at the extremity of the spindle 9, by means of which the caster is held in the tubular post or support 4.

All of the aforesaid parts are well known and in use and play no part in the present invention except in combination.

The fastener itself is composed in the present case of an irregular-shaped body of the precise form shown in Fig. 5, which is cut, stamped, or otherwise formed out of a flat piece of metal. The central portion of the metal has an opening 15, through which shaft 9 passes, and the piece is so shaped that there shall be a central annular portion provided with three or more wings or arms 8 8 8 and three or more projections 14 14 14 between the arms 8 8 8, as shown in Fig. 5. The annular portion 18 and the projections 14 are curved downward and then flattened at their extremities, as shown in Fig. 4, so as to fit and rest under the extremity of the tubular post or support 4, as shown in Fig. 1, with the downwardly-bent curved portion 18 resting upon the upper face of the socket 6, containing the balls 5. In this way a positive and firm surface is afforded at the bottom of the tubular post or support, against which the bearing-plate 6 of the caster rests. The arms or wings 8 8 8 are bent up and assume a more or less vertical position. (Shown in Fig. 1 on the line 16 16 of Fig. 5.) The extremities of the arms are provided with two slits 17 18, so as to leave three broken faces 13, 12, and 13 at the extremity of each arm on the edge of the plate. The surfaces 12 12 12 are then bent inwardly, as shown in Fig. 4, forming secondary wings, so that when the fastener is in place they engage with and rest under the enlarged head 10 of the shank 9. The arms or wings 8 8 8 are bent to such an angle with reference to the base of the fastener 18 as to form spring-surfaces, the upper edges of which engage with and hold the fastener against the inner surface of the tubular support or post 4 at the corners, as shown in Fig. 2.

If the metal out of which the fastener is made is sufficiently stiff, the friction between the points 19 at the end of the surfaces 13 and the interior surface of the post or support will be sufficient to retain the fastener in position and prevent the caster from falling out. The frictional and tensional engagement may be effected by making the fastener of such shape that six of these points of engagement 19 are provided, as shown in the drawings, or any other number of points that may be deemed desirable, but six will be found most practicable for the reason that they will offer sufficient friction and at the same time are of such shape that the surfaces 12 12 12 will engage with and hold the head 10 of the spindle 9 most satisfactorily.

I am aware that the use of internal frictional contact-surfaces between a hollow post or support and the bearing-surface of a caster—such as the bearing-surface 6 in the present case—is old, that internal surfaces for holding the spindle-head are also old, and that one or more spring-tongues cut out of the piece of metal forming the internal contact-surface have been employed, the ends of which are arranged to engage with a shoulder in the spindle of the caster and hold the same; but I am not aware of any fastening device which combines these surfaces in one and the same piece of metal and which is cut and so bent that the head upon the spindle of the caster is held by a spring device which is attached to and forms a part of the spring-plate between the ends which hold the caster by frictional and tensional engagement within the tubular post or support.

I claim as my invention—

1. The combination, with a hollow tubular post or support, and a caster; of a fastener, composed of a single piece of metal provided with two or more vertical wings the ends of which are so cut and bent that the sides and extremities of the wings engage with and form frictional and tensional engagement-points with the tubular post or support within the same, and which wings are so formed between the engagement-points, as to form spring devices for holding and supporting the head of the spindle and the caster.

2. The combination with a hollow tubular post or support and the caster, of a fastener composed of a single piece of metal cut and bent so as to form two or more wings, the extremities of which form frictional and tensional engagement-points with the tubular post or support, and provided with secondary wings cut out of the principal wings at their extremities which are first bent inward and then turned vertically upward, substantially parallel to the spindle of the caster, so that the extremity of each wing passes under and engages with the head of the spindle and holds the same.

In testimony that I claim the foregoing as my invention I have signed my name, in presence of two witnesses, this 5th day of April, 1898.

MARK FISHEL.

Witnesses:
HENRY H. GRAFF,
WILLARD PARKER BUTLER.